(12) United States Patent
Murata et al.

(10) Patent No.: US 8,227,932 B2
(45) Date of Patent: Jul. 24, 2012

(54) WIND GENERATOR HAVING AN OUTSIDE AIR-CIRCULATION FLOW PATH IN A TOWER THEREOF

(75) Inventors: Hajime Murata, Tokyo (JP); Shinsuke Sato, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 92 days.

(21) Appl. No.: 12/674,304

(22) PCT Filed: Feb. 8, 2010

(86) PCT No.: PCT/JP2010/051790
§ 371 (c)(1),
(2), (4) Date: Jun. 10, 2010

(87) PCT Pub. No.: WO2011/096080
PCT Pub. Date: Aug. 11, 2011

(65) Prior Publication Data
US 2011/0298218 A1    Dec. 8, 2011

(51) Int. Cl.
*F03D 11/00*    (2006.01)
(52) U.S. Cl. .......................................... 290/55; 290/44
(58) Field of Classification Search .................. 290/1 B, 290/44, 55
See application file for complete search history.

(56) References Cited

U.S. PATENT DOCUMENTS

| | | | |
|---|---|---|---|
| 6,676,122 B1 * | 1/2004 | Wobben .......................... | 290/55 |
| 6,774,504 B1 | 8/2004 | Lagerwey | |
| 7,168,251 B1 | 1/2007 | Janssen | |
| 7,504,742 B2 | 3/2009 | Wobben | |
| 7,837,126 B2 * | 11/2010 | Gao ............................. | 236/44 C |
| 7,905,104 B2 * | 3/2011 | Matesanz Gil et al. ....... | 62/259.1 |
| 8,058,742 B2 * | 11/2011 | Erdman et al. .................. | 290/55 |
| 2009/0045628 A1 | 2/2009 | Erdman et al. | |
| 2010/0308596 A1 * | 12/2010 | Gawrisch et al. ............... | 290/55 |
| 2012/0032448 A1 * | 2/2012 | Sato et al. ..................... | 290/1 B |

FOREIGN PATENT DOCUMENTS

| | | |
|---|---|---|
| JP | 2003510492 T | 3/2003 |
| JP | 2006515400 T | 5/2006 |
| JP | 2008088845 A1 | 4/2008 |
| JP | 2008111417 A1 | 5/2008 |
| JP | 2009531579 T | 9/2009 |
| JP | 2009068757 A | 4/2011 |
| WO | 2009094991 A2 | 8/2009 |

OTHER PUBLICATIONS

ISR for PCT/JP2010/051790 dated Feb. 8, 2010.
Reasons for Rejection for JP2010-507161 mailed Jun. 5, 2012.

* cited by examiner

*Primary Examiner* — Tho D Ta
(74) *Attorney, Agent, or Firm* — Kanesaka, Berner & Partners LLP

(57) ABSTRACT

In a wind generator, which effectively utilizes an opening of a door opening and a shell plate, and in which an outside air-circulation flow path for introducing outside air into a cooling heat exchanger in a tower is formed, a cooling medium that cools a heating element disposed in the tower circulates through a cooling heat exchanger, and heat is absorbed by exchanging heat with outside air, an outside air-circulation flow path of a closed space having an outside-air inflow opening and an outside-air discharge opening that are in communication with a door opening of a shell plate is formed in an interior space in the tower, and the cooling heat exchanger is disposed in the outside air-circulation flow path.

7 Claims, 12 Drawing Sheets

US 8,227,932 B2

WIND GENERATOR HAVING AN OUTSIDE AIR-CIRCULATION FLOW PATH IN A TOWER THEREOF

RELATED APPLICATIONS

The present application is national phase of, and claims priority to PCT/JP2010/051790 filed Feb. 8, 2010, the disclosure of which is hereby incorporated by reference herein in its entirety.

TECHNICAL FIELD

The present invention relates to a wind generator in which a cooling medium that cools a heating element in a tower circulates through a cooling heat exchanger, and heat therein is absorbed by heat exchange with respect to outside air.

BACKGROUND ART

The wind generator is an apparatus in which a rotor head having windmill blades receives wind power and rotates, and electricity is generated by a power generator that is driven by accelerating this rotation by a speed-up gear.

The rotor head is mounted on an end of a nacelle that is disposed on a windmill tower ("tower", hereinafter) and is capable of yaw-slewing, and the rotor head is supported such that the rotor head can rotate around a substantially horizontal lateral rotation axis.

Generally, towers for the windmill employ a steel monopole structure using a cylindrical shell in many cases, and a base plate provided on a lower end of a shell plate is fixed to a base of a reinforced concrete through anchor bolts.

Since such a wind generator includes an electric device such as a converter, in order to continue the stable operation, it is necessary to cool the electric device that is a heating element.

In order to cool the heating element such as the electric device, some of the conventional wind generators include a cooling device that circulates a cooling medium to cool the heating element.

As disclosed in patent literature 1 for example, the cooling device includes a heat exchanger disposed outside the tower, and a cooling medium introduced into the heat exchanger exchanges heat with respect to outside air, thereby cooling the heating element.

CITATION LIST

Patent Literature

{PTL 1} the Publication of U.S. Pat. No. 7,168,251

SUMMARY OF INVENTION

When an electric device such as a converter is disposed in the tower of the wind generator, in order to cool the electric device that is a heating element, it is necessary to dispose, in the tower, a cooling heat exchanger that exchanges heat between cooling medium and outside air, and an outside air circulation pipe through which outside air is introduced into the cooling heat exchanger. In order to dispose the outside air circulation pipe in the tower, it is necessary to provide a shell plate that is a constituent member of the tower with an opening.

Since the size of the electric device is increased and a value of heat to be generated is also increased as the wind generator is increased in size, the cooling heat exchanger and the outside air circulation pipe are also increased in size.

Technical Problem

Since there is a transport constraint, size of a cross section of the tower is limited, a rate of cooling equipment occupied in the tower is increased as the wind generator is increased in size. Therefore, it is difficult to accommodate these devices in the tower.

Such towers for the wind generators employ the steel monopole structure using the cylindrical shell in many cases. In the case of such a tower having a circular cross section, when a pipe is disposed in the tower, it is difficult to dispose the pipe while effectively utilizing the tower cross section.

In view of such a background, there is desired a wind generator in which a shell plate and a shell plate opening provided for a door through which people comes into or out from the tower are effectively utilized, and an outside air-circulating space for introducing outside air into the cooling heat exchanger in the tower is formed.

The present invention has been accomplished to solve the above problem, and it is an object of the invention to provide a wind generator in which the shell plate and the shell plate opening provided for the door are effectively utilized, and the outside air-circulating space for introducing outside air into the cooling heat exchanger in the tower is formed.

Solution to Problem

To solve the above problem, the present invention employs the following solutions.

In a wind generator of the present invention, a rotor head has windmill blades, the windmill blades receive wind power and the rotor head rotates and drives a power generator disposed in a nacelle to generate electricity, the nacelle is disposed on an upper end of a monopole tower that stands on a base, a cooling medium that cools a heating element disposed in the tower circulates through a cooling heat exchanger, and heat is absorbed by exchanging heat with outside air. An outside air-circulation flow path of a closed space having an outside-air inflow opening and an outside-air discharge opening that are in communication with an opening of a shell plate is formed in an interior space in the tower, and the cooling heat exchanger is disposed in the outside air-circulation flow path.

According to such a wind generator, the outside air-circulation flow path of the closed space having the outside-air inflow opening and the outside-air discharge opening that are in communication with the opening of the shell plate is formed in the interior space in the tower, and the cooling heat exchanger is disposed in the outside air-circulation flow path. Therefore, it is possible to easily form the outside air-circulation flow path used for heat exchange of the cooling heat exchanger utilizing the shell plate opening and the shell plate. Since the cooling heat exchanger is disposed in the outside air-circulation flow path, it is possible to efficiently cool the heating element using a low temperature cooling medium whose heat is absorbed by outside air.

Further, the opening for circulating outside air provided in the shell plate that is a reinforcing member can be also used as an opening such as a door opening. Thus, the number of openings of the shell plate can be minimized, and the number of reinforcing members for the openings can also be minimized.

In the invention, it is preferable that the outside air-circulation flow path is constructed of a partition wall provided around the opening of the shell plate in the tower and the shell plate, or of a partition wall provided around the door opening of the shell plate in the tower, the shell plate, and a floor plate in the tower.

With this outside air-circulation flow path, since the outside-air inflow opening and the outside-air discharge opening are provided in a partition wall of a concave space that is formed so as to enter inside from the opening and that separates the interior space in the tower from outside air, the outside-air inflow opening and the outside-air discharge opening open inward of the tower wall surface. Thus, it is possible to prevent rain and the like from entering the tower.

Further, since a floor surface forming member is used in a portion of the outside air-circulation flow path, members can be utilized effectively.

In the invention, when the partition wall is provided around the door opening of the shell plate to construct the outside air-circulation flow path, it is preferable that a door is mounted in the partition wall at a position different from the outside-air inflow opening and the outside-air discharge opening. With this, flexibility for securing opening areas required can be enhanced.

In the invention, the outside-air inflow opening and the outside-air discharge opening may be provided in the vertical direction with respect to a door mounted on the door opening.

Advantageous Effects of Invention

According to the wind generator of the invention, it is possible to effectively utilize the shell plate and the shell plate opening for the door through which people goes in and out from the tower, and the outside air circulation space for introducing outside air into the cooling heat exchanger in the tower can be formed. Therefore, the cooling heat exchanger can be disposed in the outside air-circulation flow path that becomes the closed space, and heat can be absorbed from a cooling medium by heat exchange with respect to outside air that circulates through the outside air-circulation flow path and the cooling medium can be cooled. Thus, the limited space in the tower can be utilized effectively, and the heating element can efficiently be cooled using a cooled low temperature cooling medium.

DESCRIPTION OF EMBODIMENTS

An embodiment of a flow path structure for circulating outside air in a tower of a wind generator according to the present invention will be described based on the drawings below.

Figure 8:
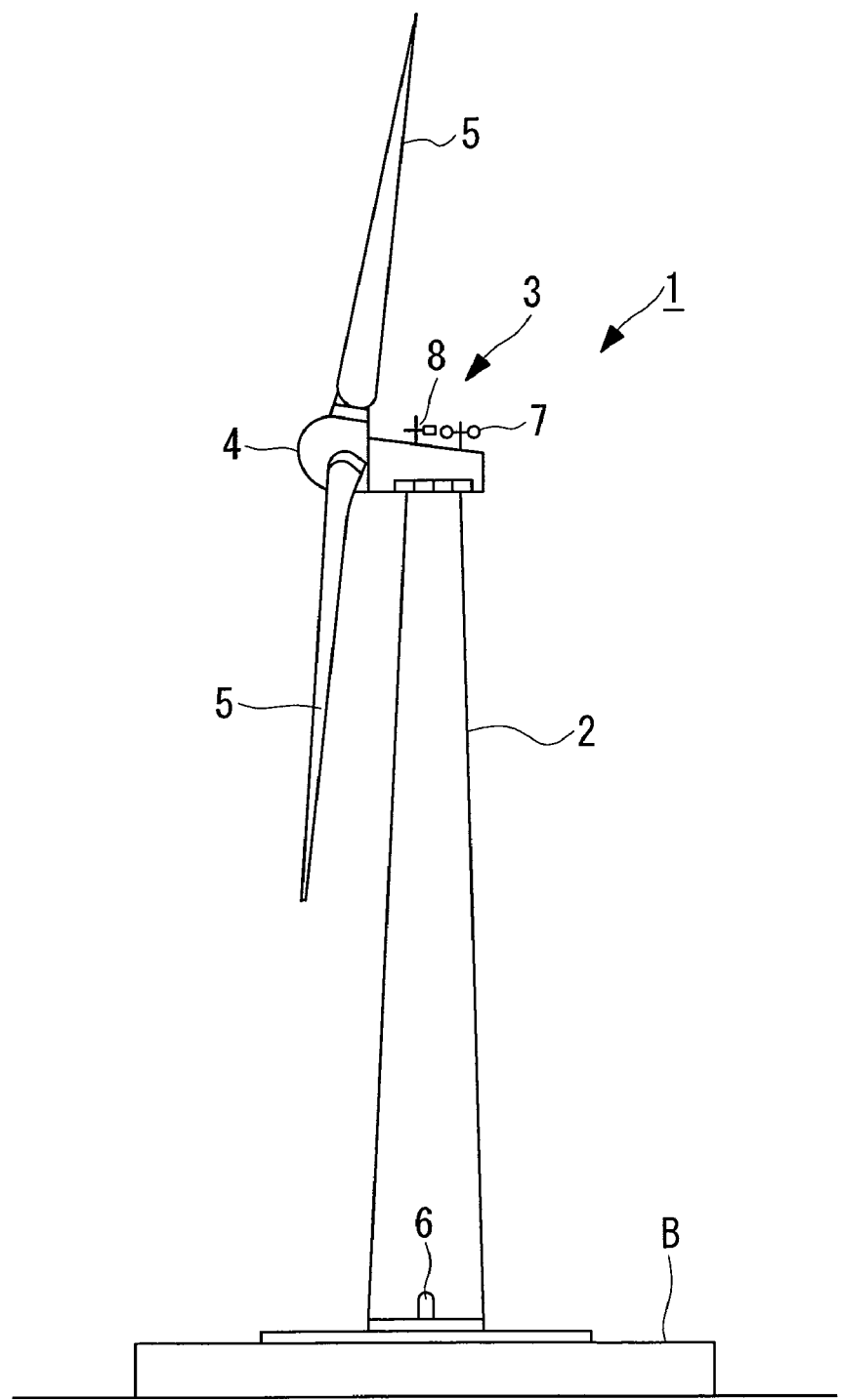
FIG. 8 is a schematic side view of the wind generator.
Figure 9:
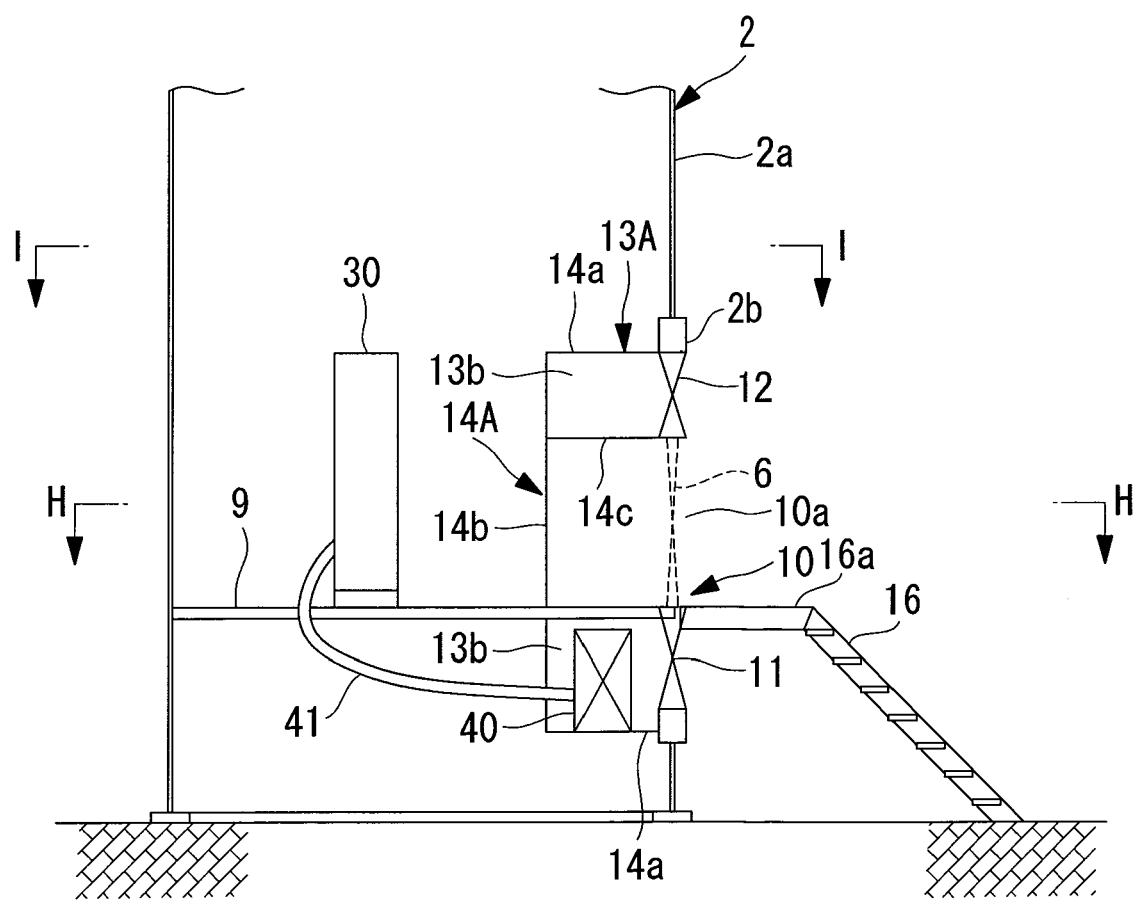
FIG. 9 is a vertical sectional view (sectional view taken along the line J-J in FIG. 10) showing a peripheral structure of a door opening of a tower as a second embodiment of a wind generator according to the present invention.
Figure 10:
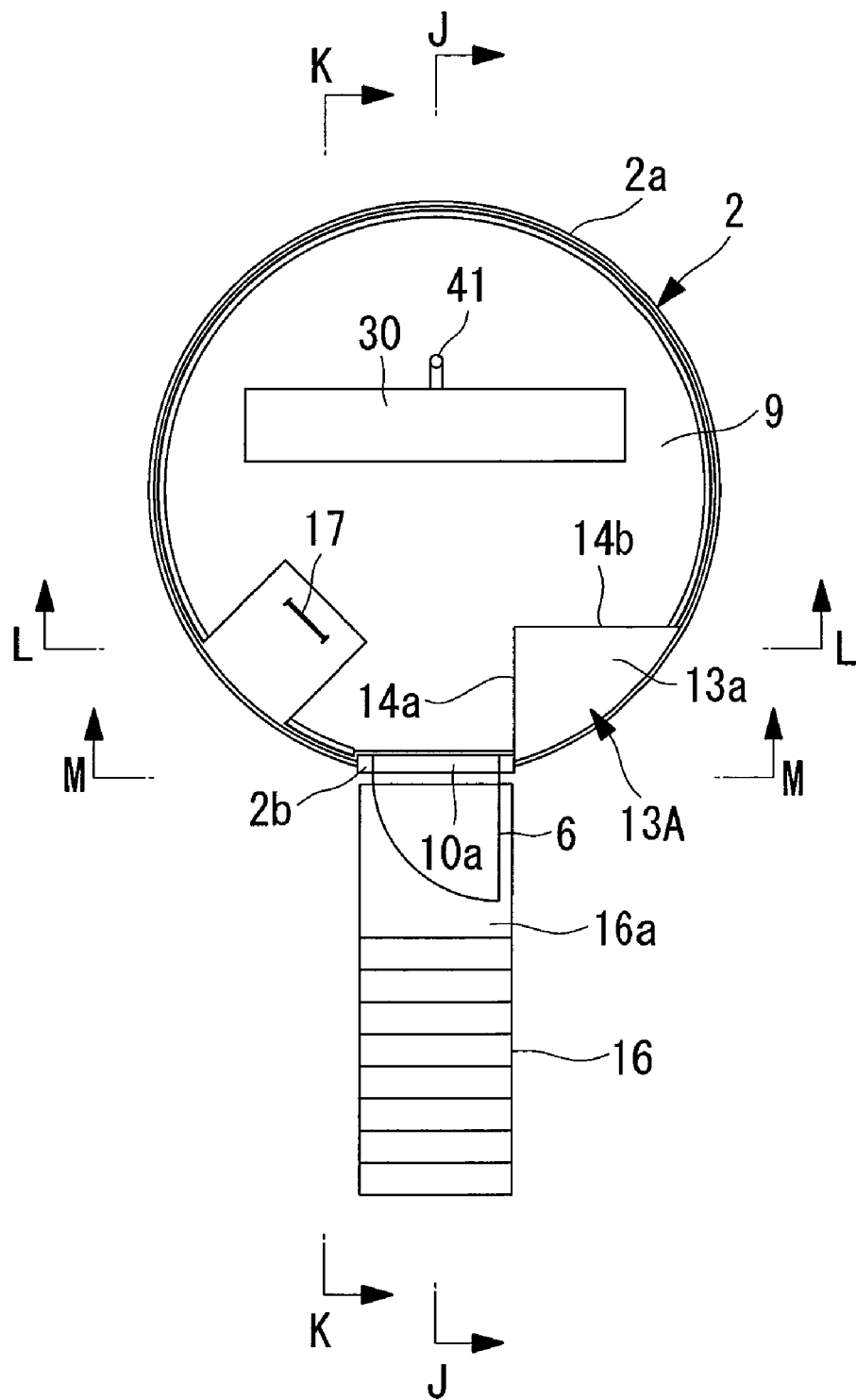
FIG. 10 is a sectional view of the wind generator shown in FIG. 9 taken along the line H-H.
Figure 11:
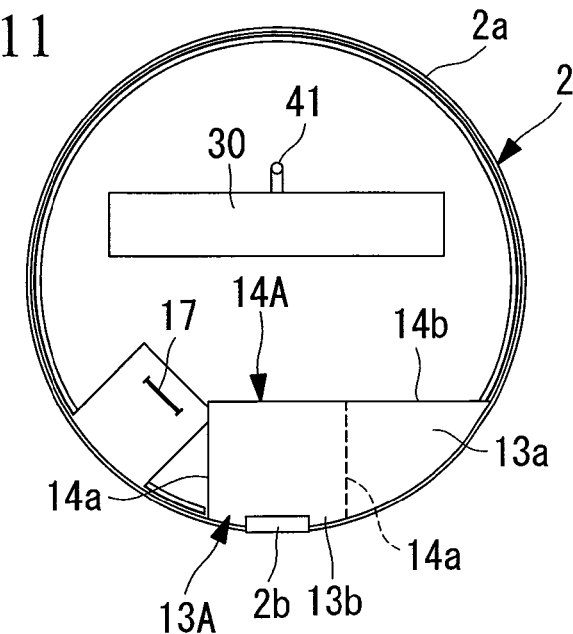
FIG. 11 is a sectional view of the wind generator shown in FIG. 9 taken along the line I-I.
Figure 12:
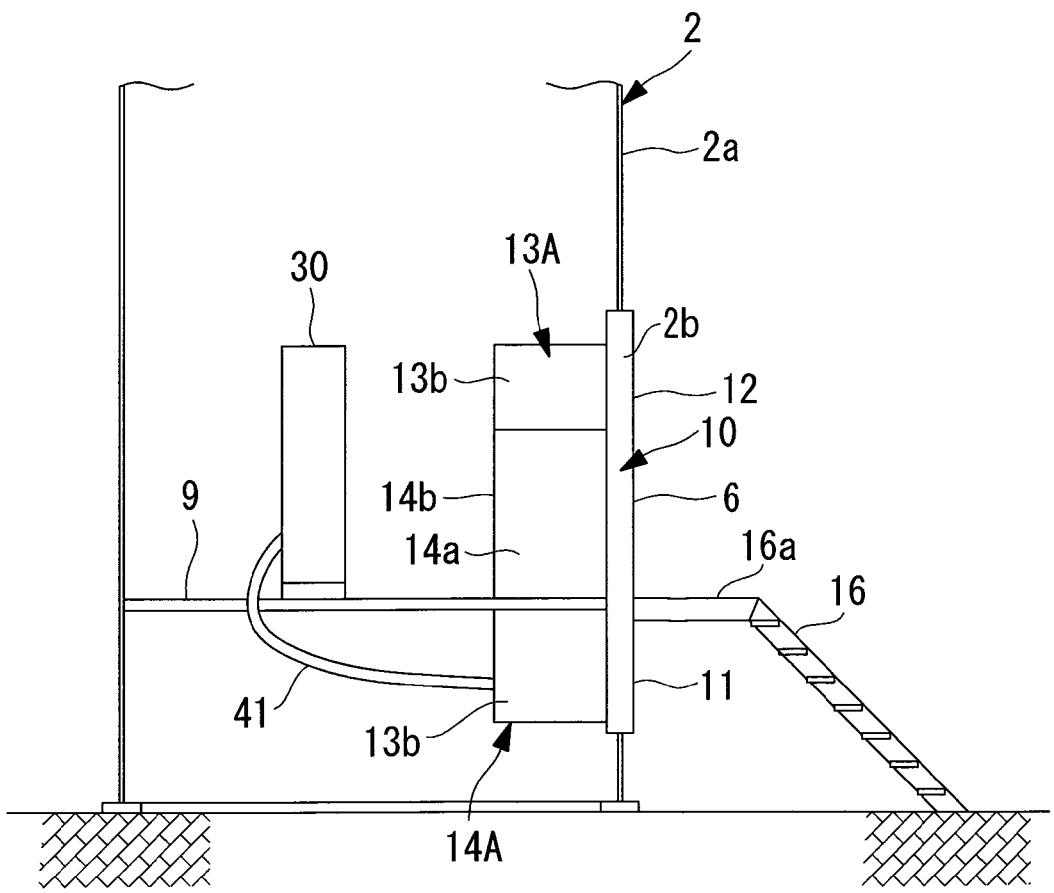
FIG. 12 is a sectional view of the wind generator shown in FIG. 10 taken along the line K-K.

A wind generator 1 shown in FIG. 8 includes a windmill tower ("tower", hereinafter) 2 standing on a base B, a nacelle 3 disposed on an upper end of the tower 2, and a rotor head 4 supported such that the rotor head 4 can rotate around a substantially horizontal lateral rotation axis and provided on a front end of the nacelle 3.

A plurality of (three for example) windmill blades 5 are mounted on the rotor head 4 radially around its rotation axis. With this, a wind power that hits the windmill blades 5 from the direction of the rotation axis of the rotor head 4 is converted into power that rotates the rotor head 4 around the rotation axis.

A door 6 through which people goes into or out from the tower is provided near a lower end of the tower 2.

An outer peripheral surface (upper portion for example) of the nacelle 3 is provided, in place, with an anemometer 7 that measures a peripheral wind speed, and an anemoscope 8 that measures a wind direction.

That is, in the wind generator 1, the windmill blades 5 receive a wind power, the rotor head 4 rotates around the substantially horizontal rotation axis, the rotor head 4 drives the power generator (not shown) disposed in the nacelle 3 to generate electricity, the nacelle 3 is disposed on the upper end of the tower 2 that stands on the base B made of reinforced concrete, and the nacelle 3 can yaw-slew.

The illustrated tower 2 is of steel monopole, and the tower 2 is formed into a cylindrical tower having a necessary length (height) by connecting flanges (not shown) of a plurality of divided tower sections to each other.

First Embodiment

In the above-described wind generator 1, a heating element 30 such as an electric device (such as a converter) is disposed in the tower 2 as shown in FIGS. 1 to 7. A floor plate 9 is continuously provided from a lower end of the door 6. The heating element 30 is disposed on the floor plate 9 in the tower 2.

A cooling heat exchanger 40 is provided in the tower 2 to cool the heating element 30. The cooling heat exchanger 40 exchanges heat between outside air and a cooling medium (water or oil) that circulates through the heating element 30. That is, in the cooling heat exchanger 40, a cooling medium cools the heating element 30 and a temperature of the cooling medium is increased, and low temperature outside air introduced from outside the tower 2 absorbs heat from the cooling medium.

In the drawings, a reference symbol 41 represents round-trip cooling medium pipes through which a cooling medium circulates between the heating element 30 and the cooling heat exchanger 40.

In this embodiment, an outside air-circulation flow path 13 is formed in an interior space of the tower 2. The outside air-circulation flow path 13 is a closed space having an outside-air inflow opening 11 and an outside-air discharge opening 12 that are in communication with a door opening 10 of a shell plate 2a. The shell plate 2a is a constituent member of the tower 2. The cooling heat exchanger 40 is disposed in the outside air-circulation flow path 13.

In the drawings, a reference symbol 2b represents a reinforcing material provided around the door opening 10 that opens into the shell plate 2a.

In the illustrated example of the structure, by mounting a partition wall 14 utilizing the door opening 10, a concave space 15 is formed so as to enter the tower 2 from the door opening 10. That is, the door opening 10 is formed into a vertically long rectangular shape as viewed from outside and front and substantially semiellipses are connected to upper and lower portions of the rectangular shape (see FIG. 7). The concave space 15 that opens the surface of the shell plate 2a is formed so as to enter the tower 2 from the door opening 10.

The concave space 15 is surrounded by the partition wall 14. The partition wall 14 includes upper, lower, left and right sidewalls 14a disposed around the door opening 10, and a front surface (forward surface) vertical wall 14b opposed to the door opening 10. In other words, the partition wall 14 of the door opening 10 includes the sidewalls 14a extending into the interior space of the tower 2 so as to surround the door opening 10, and the front surface vertical wall 14b in the tower connected to an end inside the tower of the sidewalls 14a like a bottom plate.

One end (right side as viewed from front of the door opening 10 in the illustrated example) of the vertical wall 14b in this case extends to the shell plate 2a, and the vertical wall 14b is utilized for forming the closed space of the outside air-circulation flow path 13.

The floor plate 9 is disposed at a location lower than below a vertical center position of the door opening 10. Therefore, in the following description, an upper portion of the floor plate 9 of the door opening 10 is called a door opening 10a as required. A lower portion of the floor plate 9 of the door opening 10 is the outside-air inflow opening.

The door 6 is mounted on the vertical wall 14b of the partition wall 14 provided on the forward surface (front surface) of the concave space 15 at a location higher than the floor plate 9. That is, the door 6 is provided on the vertical wall 14b of the partition wall 14.

In the drawings, a reference symbol 16 represents stairs for vertically moving between the ground and the door 6, and a footpace 16a is provided substantially at the same height as the floor plate 9.

Figure 1:
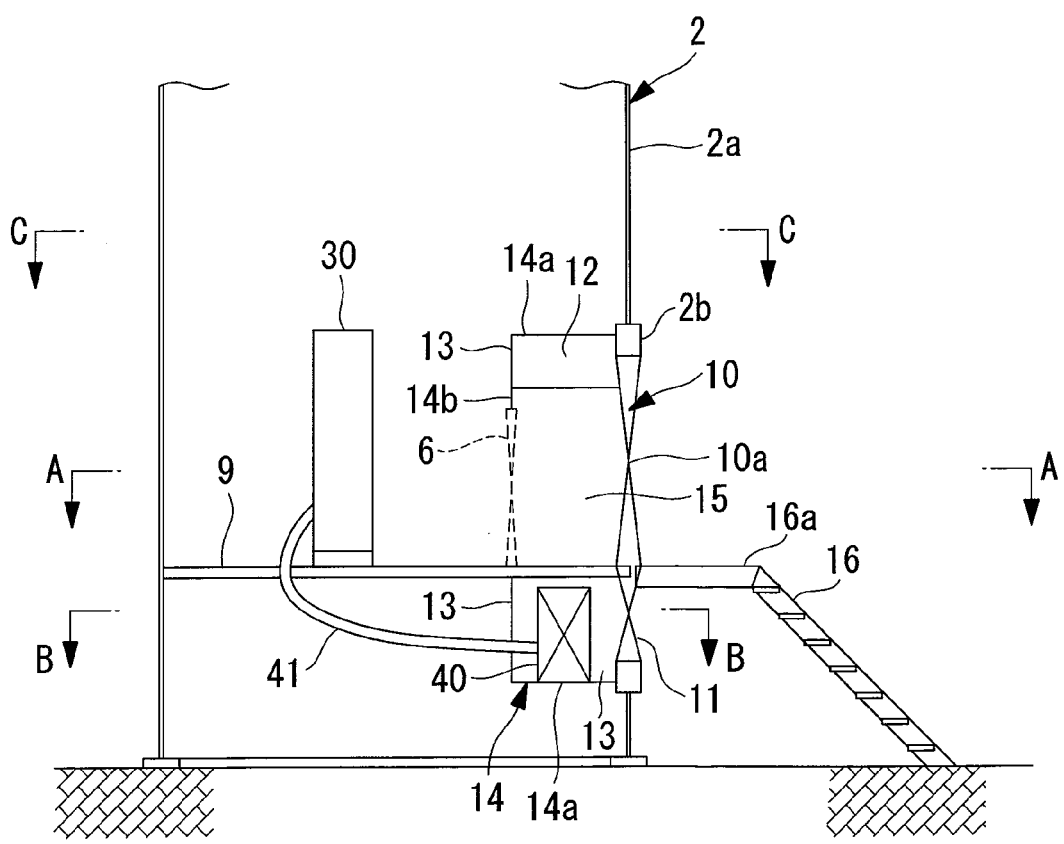
FIG. 1 is a vertical sectional view (sectional view taken along the line D-D in FIG. 2) showing a peripheral structure of a door opening of a tower as a first embodiment of a wind generator according to the present invention.
Figure 2:
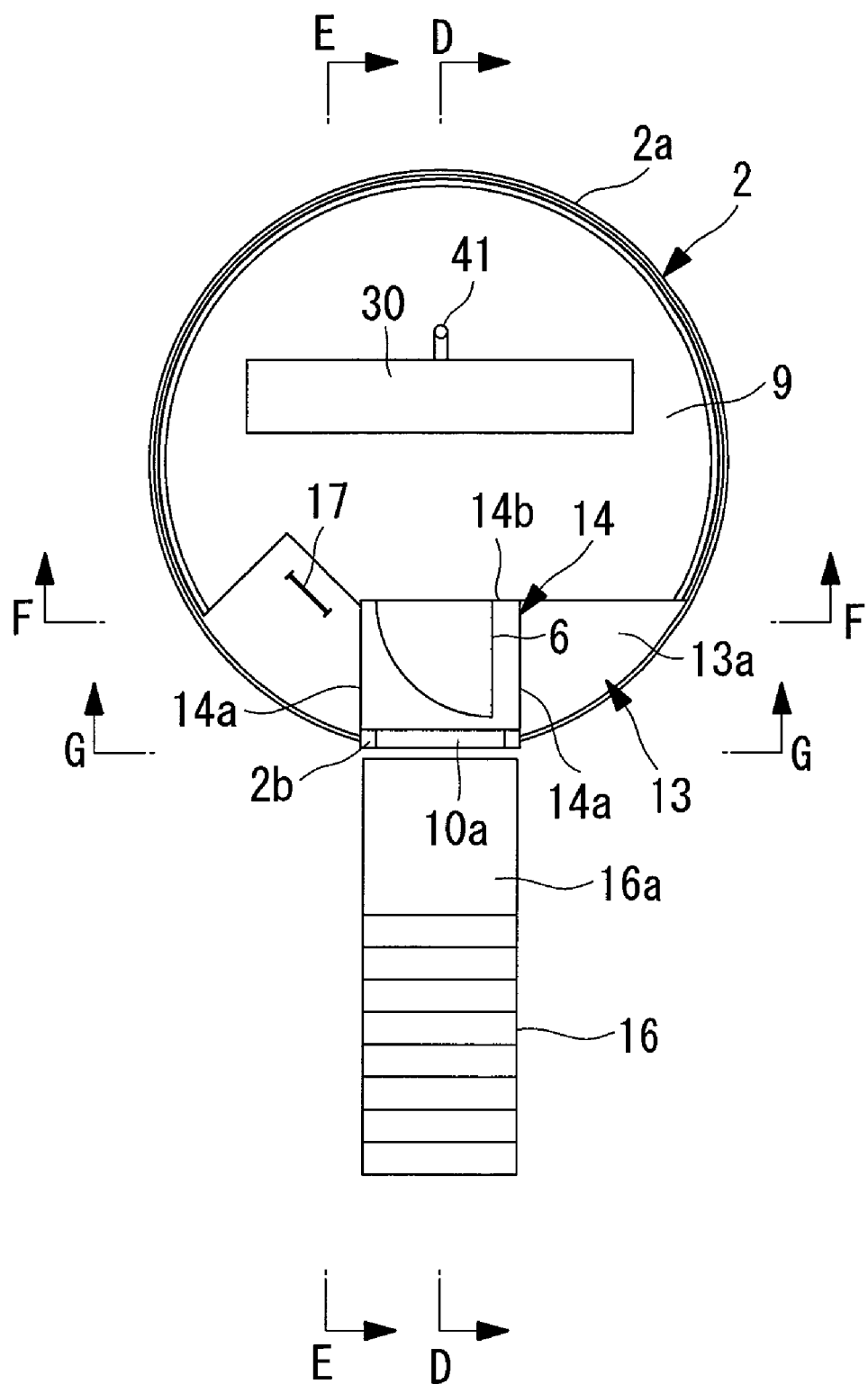
FIG. 2 is a sectional view of the wind generator shown in FIG. 1 taken along the line A-A.
Figure 3:
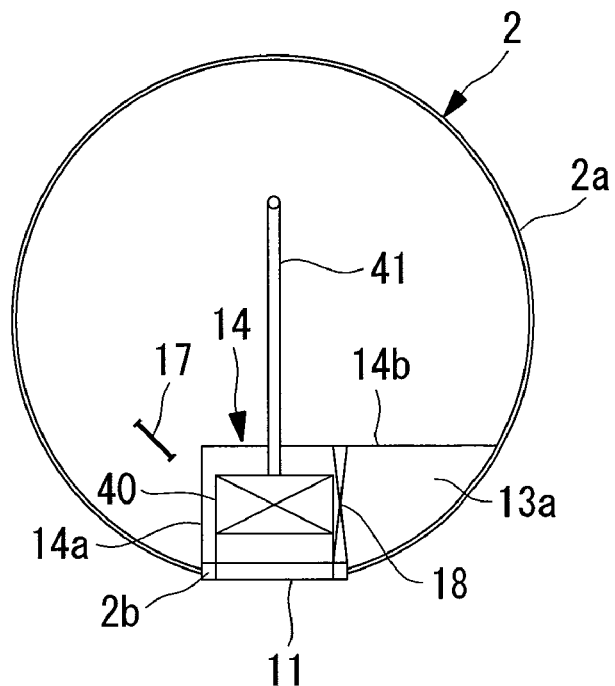
FIG. 3 is a sectional view of the wind generator shown in FIG. 1 taken along the line B-B.
Figure 4:
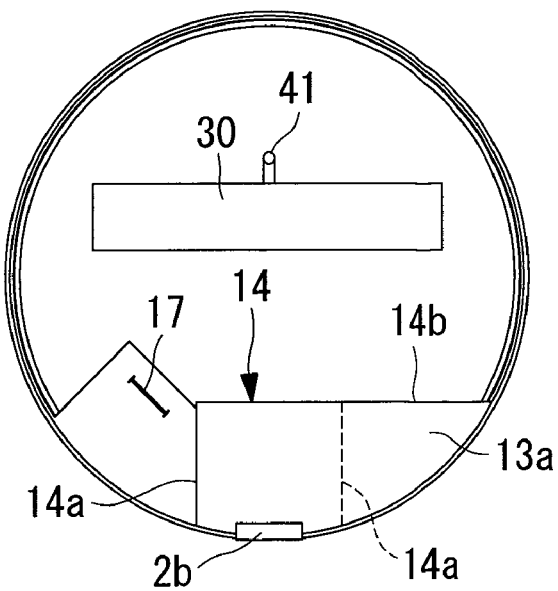
FIG. 4 is a sectional view of the wind generator shown in FIG. 1 taken along the line C-C.
Figure 5:
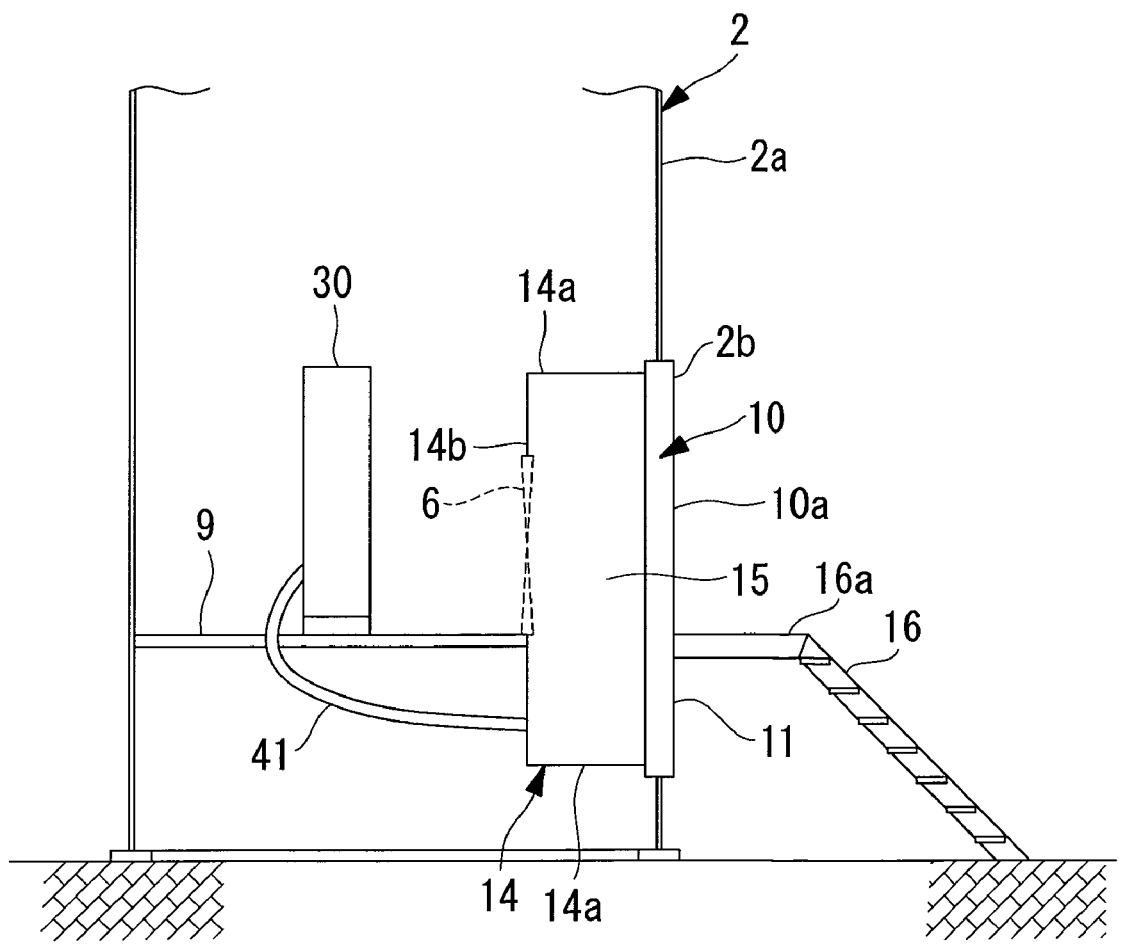
FIG. 5 is a sectional view of the wind generator shown in FIG. 2 taken along the line E-E.
Figure 6:
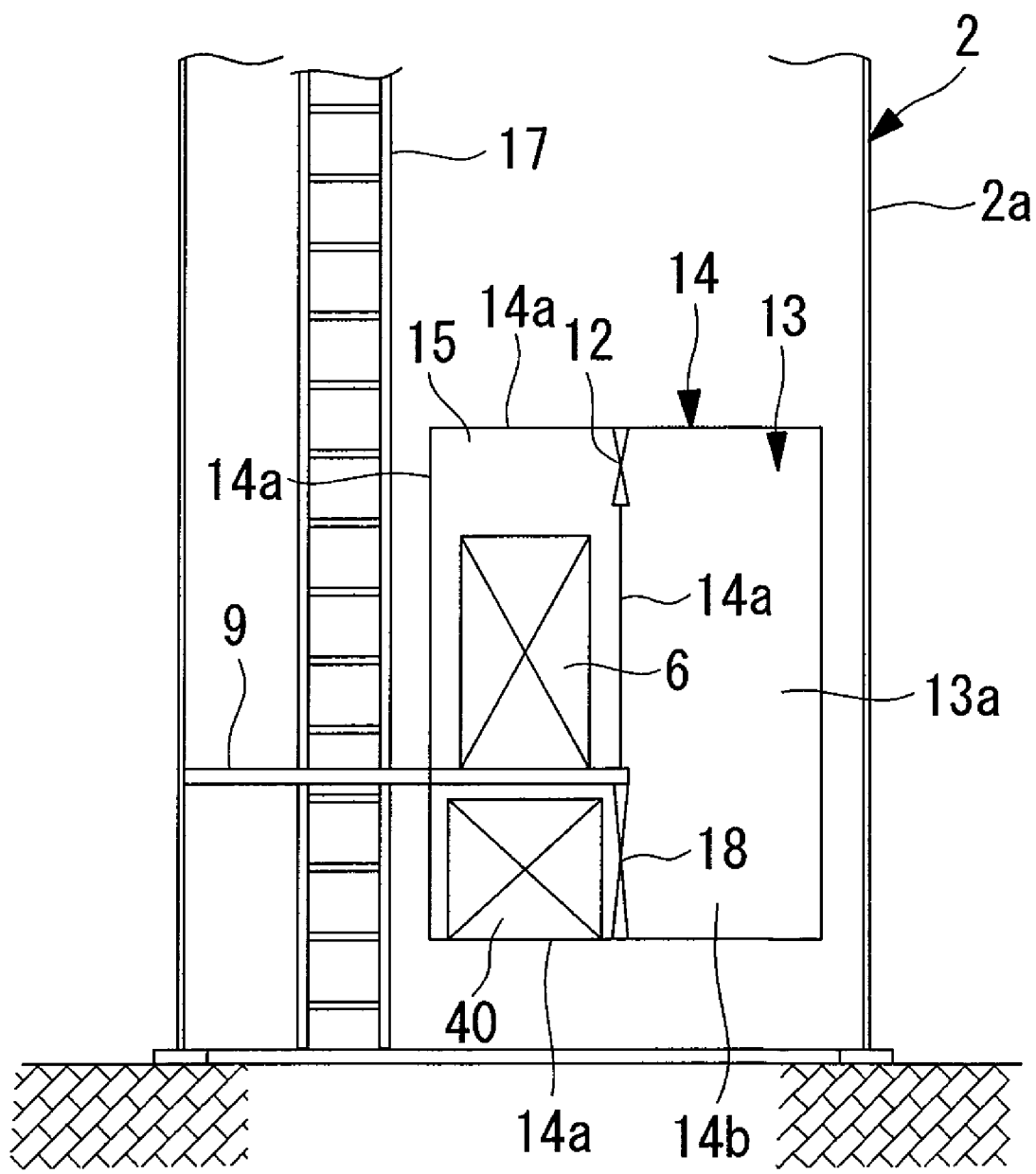
FIG. 6 is a sectional view of the wind generator shown in FIG. 2 taken along the line F-F shown.
Figure 7:
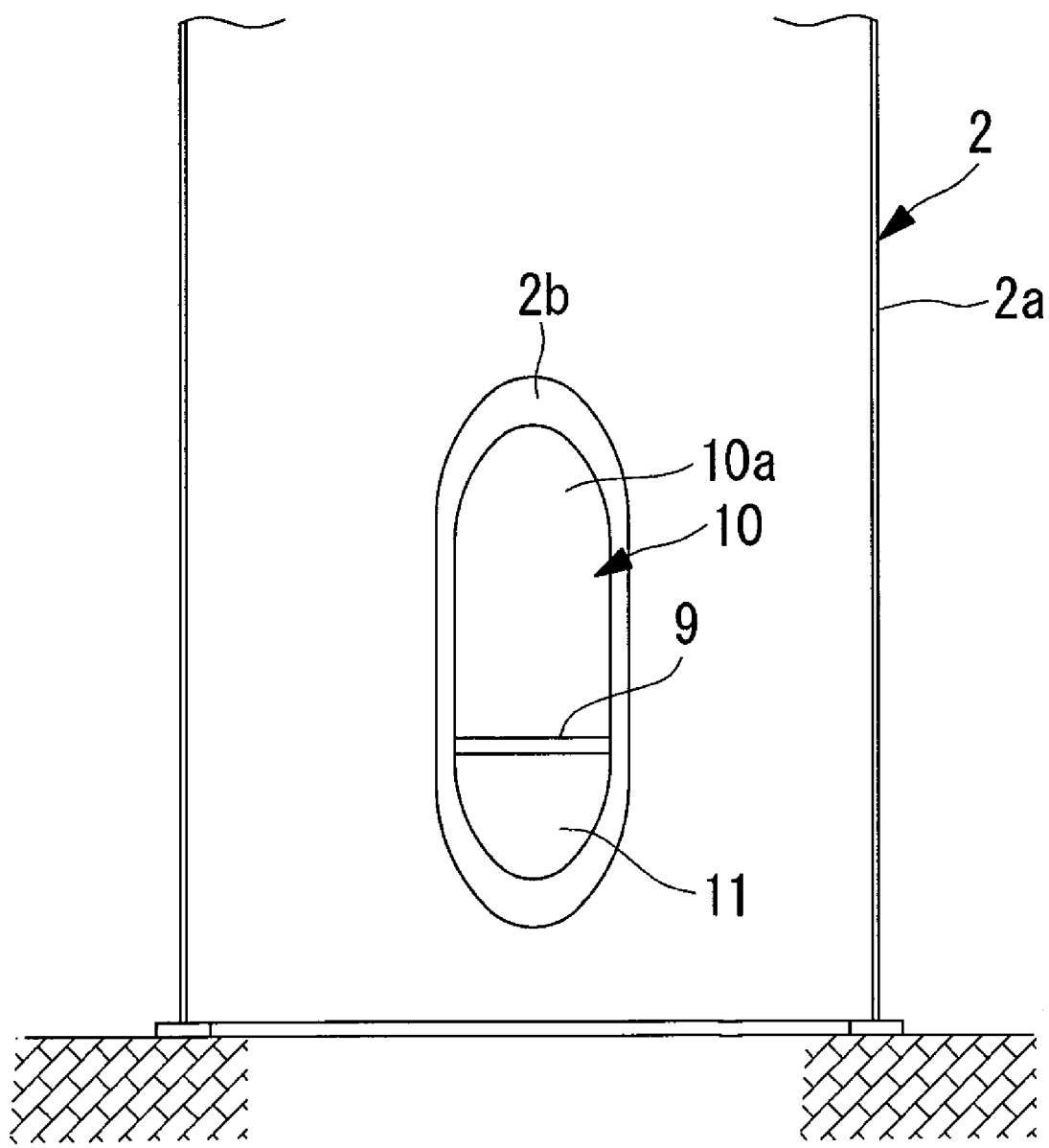
FIG. 7 is a sectional view of the wind generator shown in FIG. 2 taken along the line G-G.

A reference symbol 17 in FIG. 2 represents a ladder provided in the tower 2 for vertically moving.

The outside air-circulation flow path 13 includes the outside-air inflow opening 11 lower than the floor plate 9 of the door opening 10 and the outside-air discharge opening 12 being formed so as to enter inside from the door opening 10 and opening into the partition wall 14 of the concave space 15 that separates the interior space in the tower from outside air. In the illustrated example of the structure, the outside-air discharge opening 12 opens into the upper portion of the right sidewall 14a as viewing the door opening 10 from front.

The outside air-circulation flow path 13 includes an outside air-flow path 13a that is a closed vertical space formed in adjacent to a right side of the concave space 15 as viewing the door opening 10 from front. An outside air-circulation opening 18 is formed in a lower end of the outside air-flow path 13a, and the outside-air discharge opening 12 is formed in an upper end of the outside air-flow path 13a. The cooling heat exchanger 40 is disposed on a bottom surface of the concave space 15 located lower than the floor plate 9.

As a result, cooling outside air is introduced into the concave space 15 from the outside-air inflow opening 11 of the door opening 10 partitioned by the floor plate 9. After the outside air passes through the cooling heat exchanger 40 and its temperature rises, the outside air flows into the outside air-flow path 13a from the outside air-circulation opening 18, flows out from the outside-air discharge opening 12 to a portion in the concave space 15 higher than the floor plate 9 and the outside air is finally discharged out into the atmosphere from the door opening 10a.

That is, according to the outside air-circulation flow path 13 in this case, the concave space 15 located lower than the floor plate 9, the outside air-flow path 13a having the outside air-circulation opening 18 and the outside-air discharge opening 12, and the concave space 15 located higher than the floor plate 9 are in communication with each other.

Therefore, low temperature outside air that flows in from the outside-air inflow opening 11 that is in communication with the atmosphere passes through the cooling heat exchanger 40 disposed on the bottom surface of the concave section 15 and its temperature rises. After that, the outside air flows into the outside air-flow path 13a from the outside air-circulation opening 18, flows upward in the outside air-flow path 13a with the chimney effect, and flows out into the concave space 15 from the outside-air discharge opening 12. Since the concave space 15 into which the outside-air discharge opening 12 opens is in communication with the atmosphere through the door opening 10a, outside air having the increased temperature naturally circulates through the outside air-circulation flow path 13 and is discharged out into the atmosphere.

If the outside-air discharge opening 12 opens into the concave space 15 in this manner, since this opening opens at a position inward of an outer wall surface of the tower 2 formed by the shell plate 2a, it is possible to prevents rain and the like from entering the tower 2. Further, if the outside-air inflow opening 11 is located lower than the footpace 16a at the entrance in the tower, it is possible to prevent rain and the like from entering the tower. It is preferable that louvers are mounted on the outside-air inflow opening 11 and the outside-air discharge opening 12.

In the illustrated example of the structure, since the door 6 is mounted on the vertical wall 14b, it is possible to freely set opening areas of the outside air-circulation opening 18 and the outside-air discharge opening 12 that open into the sidewall 14a. That is, since the door 6 is mounted on the partition wall 14 at a location different from the outside air-circulation opening 18 and the outside-air discharge opening 12, it is possible to enhance the flexibility for securing opening areas required on the side of the outside air-circulation flow path 13.

According to such a wind generator 1, the outside air-circulation flow path 13 as the closed space having the outside air-circulation opening 18 and the outside-air discharge opening 12 that are in communication with the door opening 10 of the shell plate 2a is formed in the interior space in the tower 2, and the cooling heat exchanger 40 is disposed in the outside air-circulation flow path 13. Therefore, the shell plate 2a and the door opening 10 provided in the shell plate 2a through which people goes in and out from the tower 2 are effectively utilized, and it is possible to easily form the outside air-circulation flow path 13 that is used for heat exchange of the cooling heat exchanger 40.

Although the cooling heat exchanger 40 is disposed on the bottom surface of the concave space 15 in the embodiment, the location of the cooling heat exchanger 40 is not especially limited only if low temperature outside air circulates at that location. The functions of the outside-air inflow opening 11 and the outside-air discharge opening 12 (inflow and discharge of outside air) can be inverted.

Since the cooling heat exchanger 40 is disposed in the outside air-circulation flow path 13 in place, it is possible to efficiently cool the heating element 30 using a low temperature cooling medium whose heat is absorbed by outside air.

Since the opening provided in the shell plate 2a that is the reinforcing material through which outside air circulates is also used as the door opening 10, the number of openings formed in the shell plate 2a and the number of reinforcing members for the openings can be minimized.

Since the floor plate 9 is used as a portion of the outside air-circulation flow path 13, i.e., since the outside-air inflow opening 11 is separated from the outside-air discharge opening 12 by the floor plate 9 or the footpace 16a, it is possible to effectively utilize the member to prevent high temperature outside air from again entering from the outside-air inflow opening 11.

The layout of the outside air-flow path 13a is not limited to the illustrated example, and the outside air-flow path 13a may be disposed on the left side as viewing the door opening from front, for example.

The layout of the outside air-circulation opening 18 and the outside-air discharge opening 12 is not limited to the illustrated example of the structure, and may be optimized in a positional relation between the outside air-flow path 13a and the cooling heat exchanger 40 for example.

Second Embodiment

A second embodiment of the wind generator according to the present invention will be described based on FIGS. 9 to 14. The same portions as those of the previous embodiment are designated with the same reference symbols, and detailed description thereof will be omitted.

In this embodiment, the outside-air inflow opening 11 and the outside-air discharge opening 12 are provided in the vertical direction with respect to the door 6 mounted on the door opening 10. That is, the door 6 is mounted on the door opening 10a located higher than the floor plate 9 of the door opening 10, and the outside-air discharge opening 12 is formed at a substantially semielliptic portion remaining on the upper portion of the door 6. The outside-air inflow opening 11 is formed utilizing a lower opening located below the floor plate 9.

Figure 13:
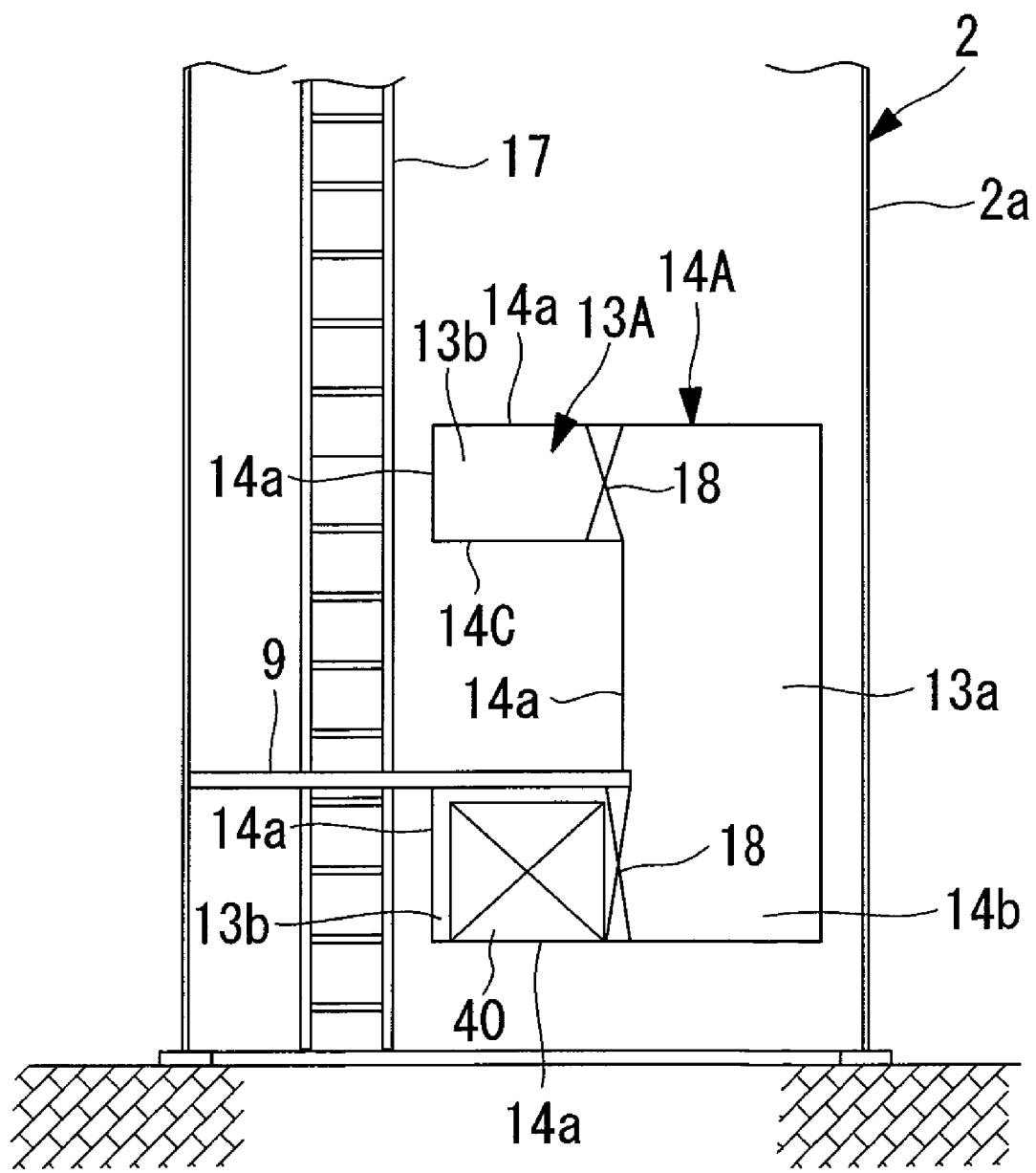
FIG. 13 is a sectional view of the wind generator shown in FIG. 10 taken along the line L-L.
Figure 14:
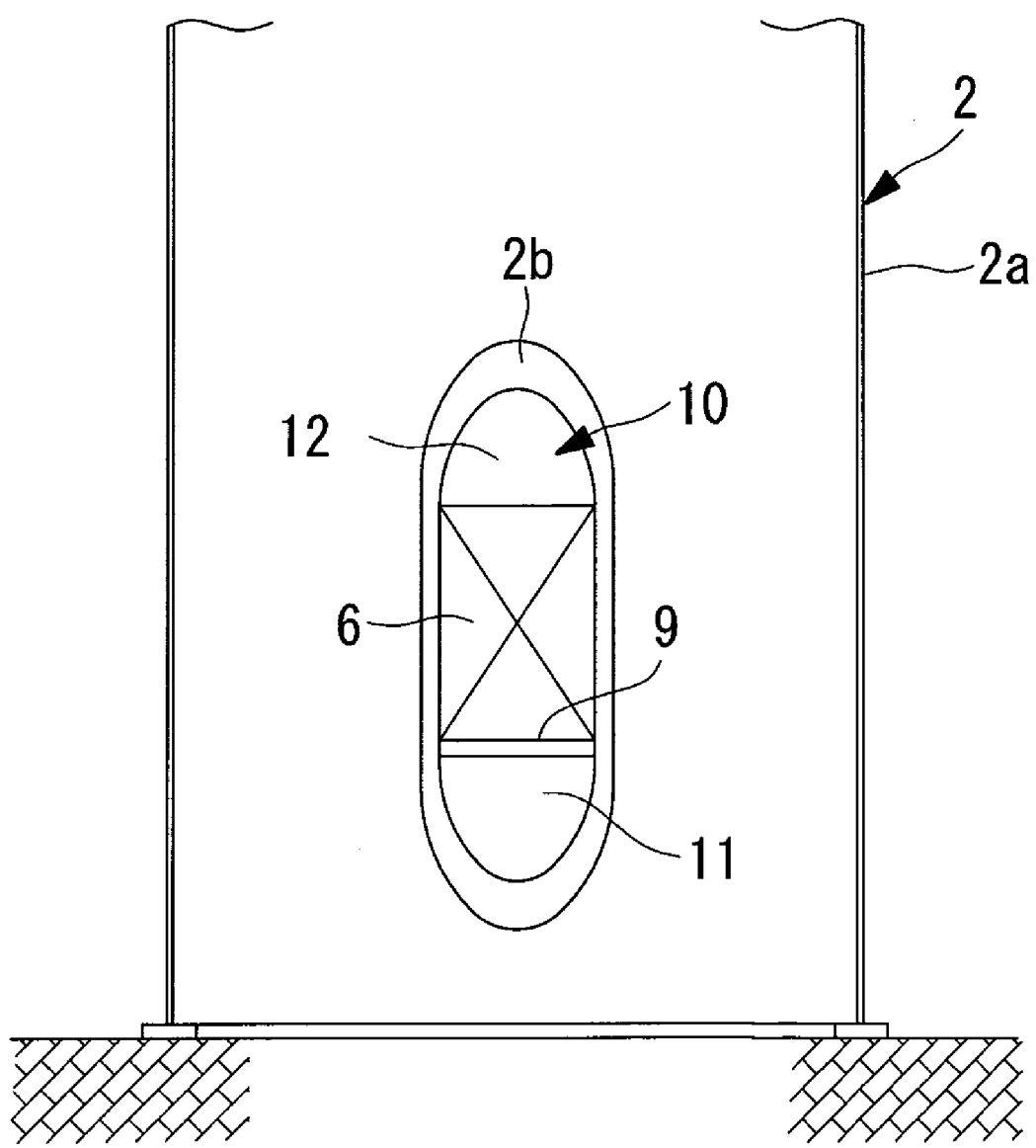
FIG. 14 is a sectional view of the wind generator shown in FIG. 10 taken along the line M-M.

In the outside air-circulation flow path 13A, as shown in FIG. 13 for example, flow path spaces 13b are formed behind the outside-air inflow opening 11 and the outside-air discharge opening 12 that open vertically with respect to the door 6, and these flow path spaces 13b are in communication with the vertical outside air-flow path 13a. With this, the outside air-flow path 13A has a substantially U-shaped cross section as viewing the door opening 10 from front.

The cooling heat exchanger 40 in this case is disposed in the flow path space 13b located below the floor plate 9 and behind the outside-air inflow opening 11.

The outside air-circulation flow path 13A is a closed space formed by a partition wall 14A. The partition wall 14A in this case includes sidewalls 14a mounted on upper, lower, left and right sides of the partition wall 14A (except a left side intermediate portion in the illustrated example) so as to enter inside from the door opening 10, a vertical wall 14b connected to ends of the sidewalls 14a, and a ceiling plate 14c that separates the upper flow path space 13b from a space into and from which people goes in or out through the door 6. For the lower flow path space 13b, the floor plate 9 is used as a wall surface member that separates from the space into and from which people goes in or out through the door 6.

In the illustrated example of the structure, a portion of the sidewall 14a mounted on the left door opening 10 as viewed from front is removed by a height amount of the passage space formed by disposing the door 6. Both end portions remaining upper and lower portions are utilized as a wall surface member that closes a side surface of the flow path space 13b.

As a result, cooling outside air is introduced into the flow path space 13b from the outside-air inflow opening 11 that opens downward of the floor plate 9, the outside air passes through the cooling heat exchanger 40 and a temperature of the outside air rises and then, the outside air flows into the outside air-flow path 13a from the flow path space 13b. The outside air flows into the upper flow path space 13b from the outside air-flow path 13a, and is finally discharged out into the atmosphere from the outside-air discharge opening 12 of the door-upper opening 10a.

That is, according to the outside air-circulation flow path 13A in this case, the flow path space 13b having the outside-air inflow opening 11 located lower than the floor plate 9, the outside air-flow path 13a in the vertical direction, and the flow path space 13b having the outside-air discharge opening 12 located higher than the floor plate 9 are in communication with each other.

Therefore, low temperature outside air that flows in from the outside-air inflow opening 11 that is in communication with the atmosphere passes through the cooling heat exchanger 40 disposed in the lower flow path space 13b and a temperature of the outside air rises. After that, the outside air flows into the outside air-flow path 13a, flows upward in the outside air-flow path 13a with the chimney effect, and flows out into the atmosphere from the outside-air discharge opening 12 that opens into the upper flow path space 13b. That is, low temperature outside air introduced from the outside-air inflow opening 11 passes through the outside air-circulation flow path 13A and naturally circulates and absorbs heat in the cooling heat exchanger 40, and is discharged out into the atmosphere.

According to such a wind generator 1, the outside air-circulation flow path 13A of the closed space having the outside-air inflow opening 11 and the outside-air discharge opening 12 that are in communication with the door opening 10 of the shell plate 2a is formed in the interior space of the tower 2, and the cooling heat exchanger 40 is disposed in the outside air-circulation flow path 13A. Therefore, the shell plate 2a and the door opening 10 provided in the shell plate 2a through which people goes in and out from the tower 2 are effectively utilized, and it is possible to easily form the outside air-circulation flow path 13A that is used for heat exchange of the cooling heat exchanger 40.

Although the cooling heat exchanger 40 is disposed in the lower flow path space 13b in the embodiment, the location of the cooling heat exchanger 40 is not especially limited only if low temperature outside air circulates at that location. The functions of the outside-air inflow opening 11 and the outside-air discharge opening 12 (inflow and discharge of outside air) can be inverted.

Since the cooling heat exchanger 40 is disposed in the outside air-circulation flow path 13A in place, it is possible to efficiently cool the heating element 30 using a low temperature cooling medium whose heat is absorbed by outside air.

Since the opening provided in the shell plate 2a that is the reinforcing material through which outside air circulates is also used as the door opening 10, the number of openings formed in the shell plate 2a and the number of reinforcing members for the opening can be minimized.

Since the floor plate 9 is used as a portion of the outside air-circulation flow path 13A, members can effectively be utilized. Further, the outside-air inflow opening 11 through which low temperature outside air is introduced and the outside-air discharge opening 12 through which outside air having increased temperature is discharged out are separated from each other by means of the floor plate 9 and the footpace 16a. Therefore, high temperature outside air discharged from the outside-air discharge opening 12 can be prevented from being introduced from the outside-air inflow opening 11 again.

According to the wind generator 1 of the present invention, the shell plate and the opening of the shell plate 2a provided as the door opening 10 are effectively utilized. Thus, the outside air-circulation flow paths 13 and 13A through which outside air is introduced into the cooling heat exchanger 40 in the tower 2 are formed so as to reliably cool a cooling medium.

Further, since an outside air-circulation space in the tower 2 is created utilizing the shell plate 2a, the limited space in the tower 2 can effectively utilized.

Further, a suction fan and an extrusion fan for facilitating ventilation and cooling may be provided at the outside air-circulation flow path 13, 13A in place.

The invention is not limited to the above-described embodiments, and the invention can appropriately be modified within a range not departing from its subject matter.

REFERENCE SIGNS LIST 1 wind generator
2 windmill tower
2a shell plate
2b opening reinforcing material of shell plate
3 nacelle
4 rotor head
5 windmill blade
6 door
9 floor plate
10 door opening
10a door opening
11 outside-air inflow opening
12 outside-air discharge opening
13, 13A outside air-circulation flow path
13a outside air-flow path
13b flow path space
14, 14A partition wall
14a sidewall
14b vertical wall
14c ceiling plate
15 concave space
16 stair
16a footpace at entrance in tower
17 ladder in tower for vertically moving
18 outside air-circulation opening
30 heating element
40 cooling heat exchanger
41 refrigerant pipe
B base

The invention claimed is:

1. A wind generator, comprising:
a base;
a monopole tower that stands on the base;
a nacelle disposed on an upper end of the monopole tower;
a power generator disposed in the nacelle;
a rotor head that has windmill blades and is rotatable, when the windmill blades receive wind power, to drive the power generator to generate electricity;
a heating element disposed in the tower;
a cooling medium for cooling the heating element;
a cooling heat exchanger for absorbing heat from the cooling medium by exchanging heat with outside air; and
an outside air-circulation flow path of a closed space in the tower and having an outside-air inflow opening and an outside-air discharge opening;
wherein
the outside-air inflow opening is in communication with a lower opening in a shell plate of the tower,
the outside-air discharge opening is in communication with an upper opening in the shell plate, and
the cooling heat exchanger is disposed at the outside-air inflow opening, that is in communication with the lower opening in the shell plate, to provide the wind generator with a natural convection circulating mechanism due to a chimney effect.

2. The wind generator according to 1, further comprising:
a partition wall provided around the opening in the shell plate, wherein the outside air-circulation flow path is defined by the partition wall and the shell plate.

3. The wind generator according to claim 1, further comprising:
a partition wall provided around the opening in the shell plate, wherein the outside air-circulation flow path is defined by the partition wall, the shell plate, and a floor plate in the tower.

4. The wind generator according to claim 3, wherein the opening is a door opening,
the wind generator further comprising:
a door is mounted in the partition wall at a position different from the outside-air inflow opening and the outside-air discharge opening.

5. The wind generator according to claim 3, wherein the opening is a door opening,
the wind generator further comprising:
a door mounted in the door opening, wherein the outside-air inflow opening and the outside-air discharge opening are provided in the vertical direction with respect to the door.

6. A wind generator, comprising:
a base;
a monopole tower that stands on the base;
a nacelle disposed on an upper end of the monopole tower;
a power generator disposed in the nacelle;
a rotor head that has windmill blades and is rotatable, when the windmill blades receive wind power, to drive the power generator to generate electricity;
a heating element disposed in the tower;
a cooling medium for cooling the heating element;
a cooling heat exchanger for absorbing heat from the cooling medium by exchanging heat with outside air; and
an outside air-circulation flow path of a closed space in the tower and having an outside-air inflow opening and an outside-air discharge opening that are in communication with a door opening in a shell plate of the tower,
wherein
the cooling heat exchanger is disposed in the outside air-circulation flow path;
the wind generator further comprising:
a partition wall provided around the door opening in the shell plate of the tower, wherein the outside air-circulation flow path is defined by the partition wall, the shell plate, and a floor plate in the tower; and a door mounted in the partition wall at a position different from the outside-air inflow opening and the outside-air discharge opening.

7. A wind generator, comprising:
a base;
a monopole tower that stands on the base;
a nacelle disposed on an upper end of the monopole tower;
a power generator disposed in the nacelle;
a rotor head that has windmill blades and is rotatable, when the windmill blades receive wind power, to drive the power generator to generate electricity;
a heating element disposed in the tower;
a cooling medium for cooling the heating element;
a cooling heat exchanger for absorbing heat from the cooling medium by exchanging heat with outside air; and
an outside air-circulation flow path of a closed space in the tower and having an outside-air inflow opening and an outside-air discharge opening that are in communication with a door opening in a shell plate of the tower,
wherein
the cooling heat exchanger is disposed in the outside air-circulation flow path;
the wind generator further comprising:
a partition wall provided around the door opening in the shell plate of the tower, wherein the outside air-circulation flow path is defined by the partition wall, the shell plate, and a floor plate in the tower; and
a door mounted in the door opening, wherein the outside-air inflow opening and the outside-air discharge opening are provided in the vertical direction with respect to the door.

* * * * *